(12) United States Patent
Lee et al.

(10) Patent No.: US 6,298,655 B1
(45) Date of Patent: Oct. 9, 2001

(54) AIR SUPPLY DUCT FOR HEAT RECOVERY STEAM GENERATORS

(75) Inventors: Byeong-Eun Lee; Jae-Wook Ryu; Sung-Jin Park; Chae-Su Lee, all of Kyungsangnam-do (KR)

(73) Assignee: Korea Heavy Industries & Construction Co., Ltd., Kyungsangnam-Do (KR)

( * ) Notice: Subject to any disclaimer, the term of this patent is extended or adjusted under 35 U.S.C. 154(b) by 0 days.

(21) Appl. No.: 09/475,020

(22) Filed: Dec. 30, 1999

(30) Foreign Application Priority Data

May 25, 1999 (KR) .................................................. 99-18890

(51) Int. Cl.$^7$ ........................................................ F02C 6/00
(52) U.S. Cl. ................... 60/39.182; 60/39.02; 60/39.07; 60/39.5
(58) Field of Search .............................. 60/39.182, 39.5, 60/39.07, 39.02

(56) References Cited

U.S. PATENT DOCUMENTS

| 4,555,902 | 12/1985 | Pilarczyk . | |
|---|---|---|---|
| 4,767,319 | 8/1988 | Vosper . | |
| 5,461,853 | 10/1995 | Vetterick . | |
| 5,555,718 | * | 9/1996 | Anderson et al. ................ 60/39.182 |
| 5,558,047 | 9/1996 | Vetterick . | |

* cited by examiner

*Primary Examiner*—Charles G. Freay
*Assistant Examiner*—E D Hayes
(74) *Attorney, Agent, or Firm*—Lowe Hauptman Gilman & Berner, LLP

(57) ABSTRACT

The present invention relates to an additional air supply duct which is additionally installed at the inlet duct connected to an exhaust duct of a gas turbine of a combined-cycle power generation apparatus, for providing the air required for additional combustion in the duct burner of a heat recovery steam generator. The air supply duct of a heat recovery steam generator according to the present invention diverges to left and right at the upper side of the real portion of the inlet duct connected to the exhaust duct of the gas turbine, and the terminal parts thereof, facing each other in a staggered manner, are respectively installed through the left and right sides of the inlet duct. Further, the penetration depth into the inlet duct is set to one eighth of the width of the inlet duct. In this way, uniform distribution of oxygen concentration can be formed at the end face of the entrance of the duct burner, thereby simultaneously achieving flame stability and complete combustion.

8 Claims, 4 Drawing Sheets

[Figure 1]
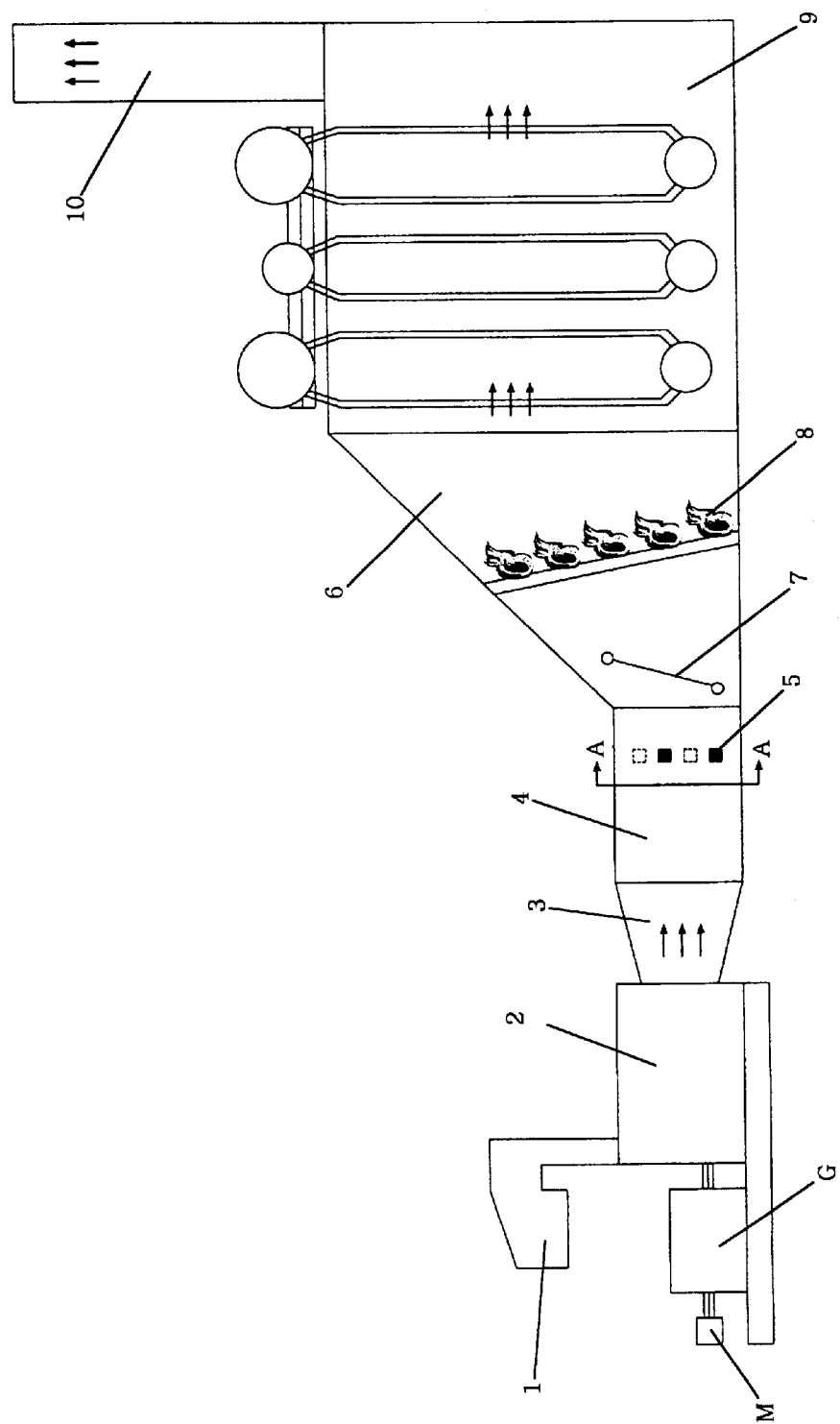

[Figure 2]
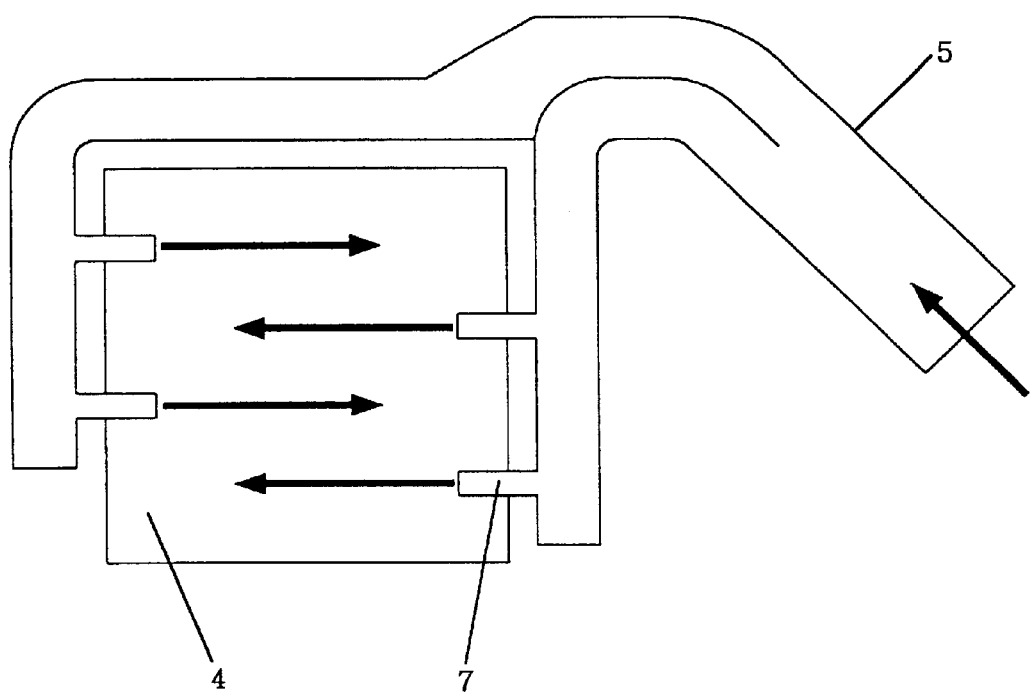
[Figure 3a]
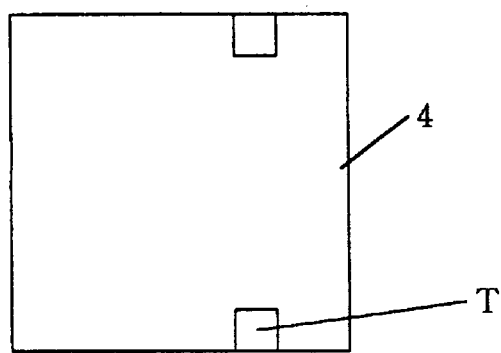

[Figure 3b]
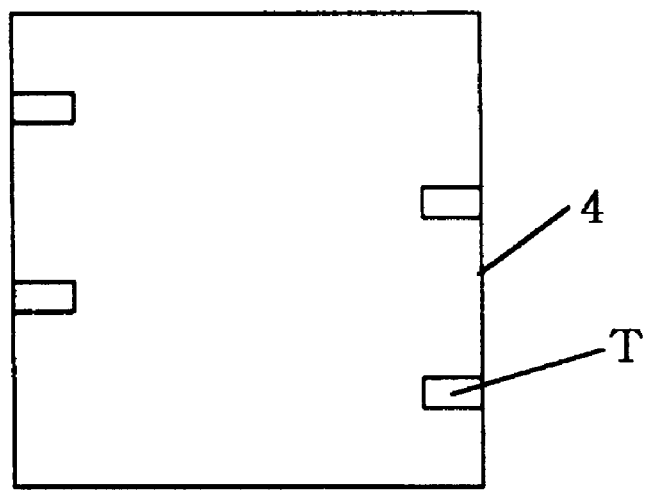
[Figure 3c]
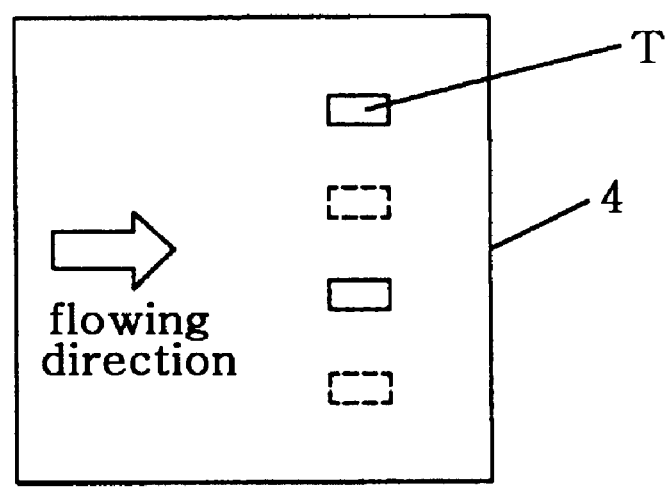

[Figure 4]
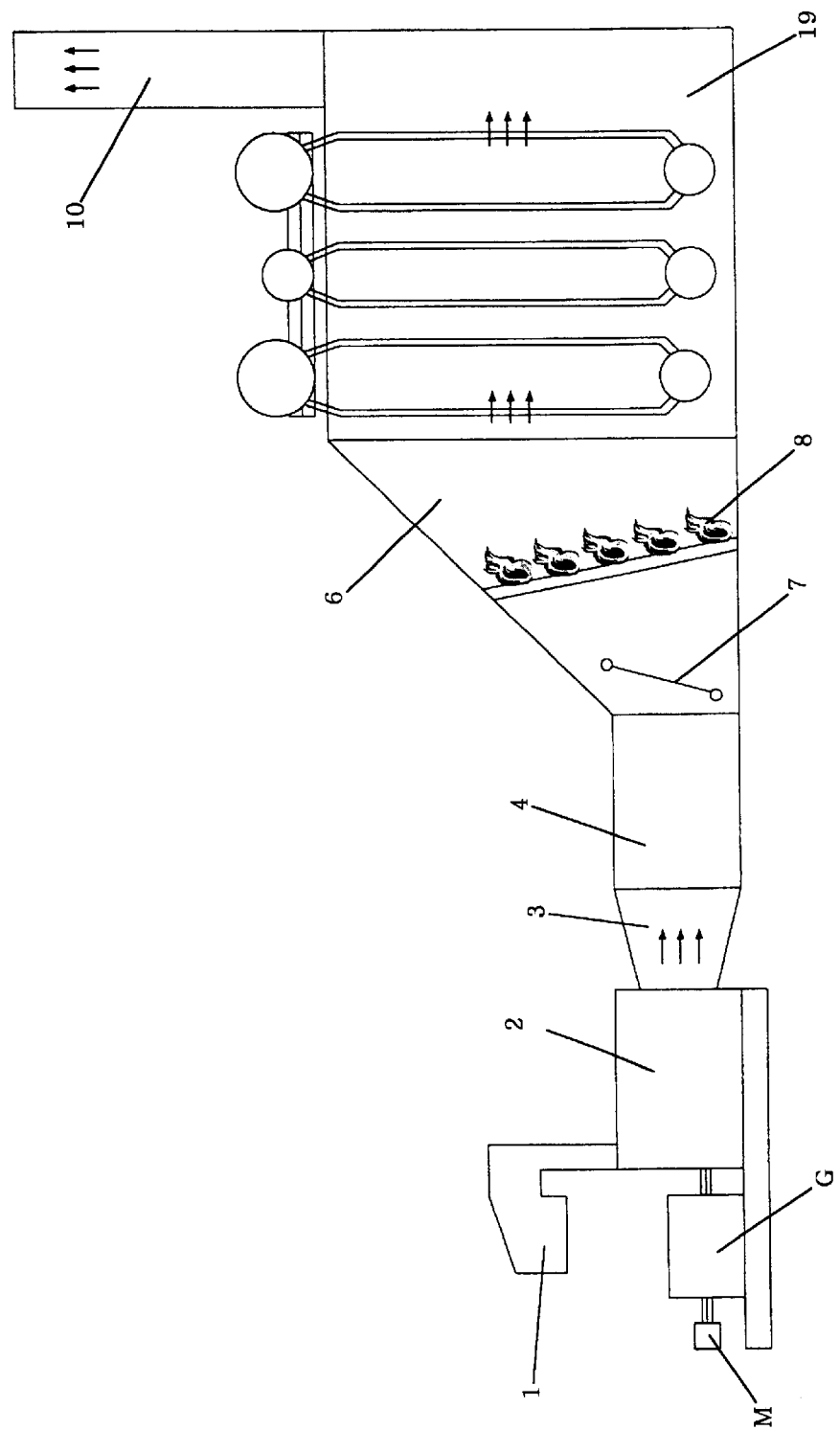

AIR SUPPLY DUCT FOR HEAT RECOVERY STEAM GENERATORS

TECHNICAL FIELD

The present invention relates to an additional air supply duct which is additionally installed at an inlet duct connected to an exhaust duct of a gas turbine of a combined-cycle power generation apparatus, for the purpose of providing the air required for additional combustion in the duct burner for a heat recovery steam generator.

BACKGROUND ART

With the strengthening of the environmental regulations in the recent years, there has been a dramatic increase in the construction of combined-cycle power plants of high performance and reliability with reduced exhaust pollution, in contrast to coal or nuclear power generation apparatus.

A combined-cycle power generation apparatus as such consists essentially of a gas turbine, a heat recovery steam generator, and a steam turbine.

In the aforementioned combined-cycle power generation apparatus, for the purpose of increasing system efficiency, the combustion gas of high temperature is first produced by combustion of fossil fuel, which is then used to run the gas turbine for generating electric power. The steam is produced in the heat recovery steam generator by high-temperature combustion gas (exhaust gas) discharged from the gas turbine, and said steam is used to run the steam turbine for secondarily generating electric power.

FIG. 4 is an outlined configuration diagram which illustrates the relevant regions of the gas turbine and the heat recovery steam generator (hereinafter HRSG) in the constituent elements of an ordinary combined-cycle power apparatus. A heat recovery steam generator (19) comprises an inlet duct (4), a transition duct (6), a heat exchange having a finned tube, and a stack (10).

The operation principle herein is as follows: First, as the high-temperature combustion gas which is streamed in from the exhaust duct (3) of the gas turbine (2) passes through the flow correction device (7) installed in the transition duct (6) of the heat recovery steam generator (19), the flow therein is evenly distributed, and the combustion gas is influxed into the first heat transfer surface, i.e. a tube bundle for heat exchange in the high-pressure section.

The combustion gas flowing into the tube bundle for heat exchange transfers heat to the water or steam flowing inside the finned tube, thereby producing steam of high pressure and temperature. Then, the combustion gas in the state of low temperature is discharged through the stack (10) to the outside.

Of the components of said heat recovery steam generator (19), the flow correction device (7) installed at the inlet duct (4) is used for forming a uniform flow distribution at the entrance of the heat exchanger in the high-pressure section. Consequently, the flow correction device (7) plays a very important role in enhancing thermal efficiency of a heat recovery steam generator (19) and in preventing damages to the finned tube.

Meanwhile, for generating additional electric power, the steam of high pressure and temperature generated from the tube bundle is forwarded to the steam turbine (not illustrated).

Generally, the amount and the temperature of the exhaust gas coming out from the gas turbine (2) tend to stay at a certain state of condition (level), depending on the gas turbine model. As such, the amount and the temperature of the steam, which can be produced in the heat recovery steam generator (19), are usually set to constant values.

However, as occasion demands, it is necessary to additionally increase the amount of steam production. For example, in the following circumstances, it is necessary to supply additional energy for increasing the amount of the steam produced in the heat recovery steam generator (19): (a) when the steam produced from the heat recovery steam generator (19) is used not only for generation of electric power but also for heating the interior of the plant, etc. or (b) the demands of a user cannot be met with a simple combination of gas and steam turbines.

For these reasons, a duct burner (8) is typically installed at the entrance of the heat recovery steam generator (19) to heat the exhaust gas discharged from the gas turbine (2). In such cases, the oxygen concentration around the duct burner (8) must be high for smooth combustion. Therefore, the additional combustion air should be provided thereto, in addition to the oxygen in the exhaust gas discharged from the gas turbine.

However, in the conventional combined-cycle power apparatus, the facilities for separately providing combustion air were inadequate. Consequently, it could not properly accommodate the situation where the oxygen had to be additionally supplied thereto.

Here, No. 1 in FIGS. 1 and 4, which has not been explained, is an air inlet, and G stands for a generator, and M a motor.

For reference, a heat recovery steam generator, depending on the use or non-use of the duct burner (8), is classified into a supplemental-fired heat recovery steam generator or an unfired heat recovery steam generator.

SUMMARY OF THE INVENTION

With respect to the combined-cycle power generation apparatus, the present invention was devised to solve the problems of the conventional heat recovery steam generator. The objectives of the present invention are to provide the means for structuring the combined-cycle power generation apparatus in such a manner to optimally mix the newly fed air and the exhaust gas discharged from the gas turbine, reducing production costs by means of easy installation of such structure, and minimizing the internal pressure drop of the heat recovery steam generator at the time of such admixing.

In order to effectively achieve the above objectives, the present invention provides an additional air supply duct installed at the inlet duct connected to the exhaust duct of the gas turbine. As such, it is able to provide the combustion air required for the additional combustion in the duct burner for the heat recovery steam generator.

However, in the cases as above where combustion air is newly supplied thereto, the distribution of oxygen concentration should be uniform at the duct plane upstream immediately of the duct burner for the purposes of achieving complete combustion and flame stability.

In this regard, the present invention specifically defines the configuration of the air supply duct in order to optimally mix the exhaust gas discharged from the gas turbine with the newly fed air in a limited space.

To elaborate, the air supply duct of the present invention is designed according to the following points: The optimum design method is applied to the position of the air supply duct and its alignment in order to smoothly mix the newly added air with the high-temperature exhaust gas discharged from the gas turbine. This is so because of the fact that the newly added combustion air contains a relatively higher concentration of oxygen than the exhaust gas discharged by the gas turbine.

Further, in order to minimize the loss of the internal pressure of the heat recovery steam generator, the penetration depth (insertion depth) of the air supply duct protruding into the inlet duct, and the configuration of the terminal parts of the air supply duct connected to the fan are specifically prescribed. If the loss of the internal pressure of the heat recovery steam generator increases, the capacity of the fan has to be correspondingly enlarged, thereby increasing the production costs in addition to large operation costs associated with the increased consumption of electric power for operating the fan. Of course, such drawback is a factor for making the product unattractive for sales.

Finally, it can be installed with ease and simplicity onto the conventional combined-cycle power generation apparatus and is designed in such a manner to minimize the production costs.

BRIEF DESCRIPTION OF THE DRAWINGS

FIG. 1 is an outlined drawing which shows the structure of the heat recovery steam generator mounted with an air supply duct according to the present invention.

FIG. 2 is a cross-sectional view of FIG. 1 along the line A—A'.

FIG. 3a~FIG. 3c show the plane, front, and side views of the air supply duct according to the present invention.

FIG. 4 is an outlined configuration diagram illustrating the relevant regions of the gas turbine and the heat recovery steam generator with respect to the constituent components of the ordinary combined-cycle power generation apparatus.

DETAILED DESCRIPTION OF THE PREFERRED EMBODIMENTS

Below, the structure of the air supply duct according to the present invention is described in detail with reference to accompanying drawings.

The constituent elements of the present invention, which have the same configurations and functions as those in the conventional apparatus have been duly omitted.

FIG. 1 is the same sort of drawing as FIG. 4 and illustrates the additional air supply duct which has been additionally installed at the inlet duct of the heat recovery steam generator (9) according to the present invention.

As shown in FIG. 1, the air supply duct (5) according to the present invention is mounted by means of tube installation in the rear end of the inlet duct (near the transition duct) connected to the exhaust duct (3) of the gas turbine (2). This is so because the air supply duct (5) must be installed at the frontal side of the flow correction device (7) in order to obtain uniform distribution of oxygen concentration at the entrance of the duct burner (8).

The flow correction device (7) is a device that controls the flow distribution (exhaust gas and combustion air). In the case of a heat recovery steam generator, the device functions to establish uniform flow at the entrance of the duct burner (8), thereby effectuating further mixing of the combustion gas with the high-temperature exhaust gas flowing in from the gas turbine (2).

The relationship between the inlet duct (4) and the air supply duct (5) is clearly illustrated in FIGS. 2 and 3a~3c.

In the above embodiment, the terminal part (T) of the air supply duct (5) was installed through the right and left sides of the inlet duct (4) for an air-tight seal, thereby allowing the newly provided air through the fan to be diverged into two streams at the upper right portion of the inlet duct (4) and supplying the air to the left and right sides, respectively.

Of course, for installation at minimum cost, the duct should be so designed as to effectively provide new air without any attachment of a control device.

Meanwhile, the penetration depth of the terminal part should be approximately one eighth of the width of the inlet duct (4), and they should be aligned in a staggered manner from the side perspective. Accordingly, the total cross-sectional area of the air supply duct (5) can be measured.

In this way, facing each other, the terminal parts of the air supply duct (5) are mounted thereto for equally injecting (supplying) new air from the opposite sides. As such, uniform distribution of oxygen concentration can be obtained widthwise in the inlet duct (4). In such cases, however, the penetration depth of the terminal part in widthwise direction must be taken into consideration.

Meanwhile, when multiple terminal parts (T) are installed at the upper and lower parts of the inlet duct (4) at a regular interval, the uniform distribution of oxygen concentration can be obtained in the lengthwise direction. As the number of installed terminal parts increases, more the oxygen concentration becomes uniform in the lengthwise direction.

In such cases, however, there are some drawbacks in that it is difficult to supply a fixed amount of flow to the respective terminal parts (T) in addition to an ensuing increase in production costs. In this regard, the number of installations must be adjusted, depending on different circumstances.

Below, the function of the air supply duct according to the present invention is explained.

The combustion air provided through the air supply duct (5) is at first admixed by diffusion based on its temperature differential with the strong turbulence component of the exhaust gas discharged from the gas turbine (2). However, solely based on this condition, it is difficult to obtain uniform distribution of oxygen concentration at the entrance of the duct burner (8).

Accordingly, in the present invention, the air supply duct (5) is installed in front of the flow correction device (7) to allow the two fluids of different properties to be admixed for one more time by means of strong agitation as they pass through the flow correction device (7). In this way, the uniform distribution of oxygen concentration can be achieved at the entrance of the duct burner (8).

Further, as shown in FIGS. 3a~3c, the terminal parts (T) of the air supply duct (5) were made to align at the right and left sides of the inlet duct (4) in a staggered manner in order to effectuate proper mixing of the two fluids in width and lengthwise directions of the inlet duct (4).

Still further, the configuration of the terminal part (T) of the air supply duct (5) was rendered rectangular with the width-to-height ratio of 2 to 1, and the penetration depth into the interior of the inlet duct (4) was set to one eighth of the width of the inlet duct (4), thereby allowing the combustion air to infiltrate into the inlet duct (4) with ease.

However, the configuration of the terminal part (T) of said air supply duct and the penetration depth should not deemed to be limited by the embodiments of the present invention but can be altered in various manners under different circumstances.

As described above, in the case of a combined-cycle power generation apparatus comprising a heat recovery steam generator with the separate additional air supply duct according to the present invention, the uniform distribution of oxygen concentration at the end face of the entrance of the duct burner (8) can be established, with the results of achieving flame stability and complete combustion in the duct burner (8).

What is claimed is:

1. A heat recovery steam generator, comprising:

an inlet duct coupled to an exhaust duct of a gas turbine for receiving an exhaust gas from said gas turbine;

at least one air supply duct installed in a wall of said inlet duct for mixing an additional air flow with said exhaust gas;

a transition duct coupled to said inlet duct and provided with a flow correction device for receiving and distributing a mixture of said air and said exhaust gas uniformly; and a heat exchange section coupled to said transition duct for receiving said uniformly distributed mixture;

said at least one air supply duct being located upstream of said flow correction device for providing a substantially uniform distribution of said air and said exhaust gas in said mixture.

2. The heat recovery steam generator of claim 1 further comprising a duct burner installed in said transition duct between said flow correction device and said heat exchange section, for additionally heating said exhaust gas using oxygen contained in said air uniformly distributed in said mixture.

3. The heat recovery steam generator of claim 1 wherein said at least one air supply duct comprises a plurality of terminals extending through said wall of said inlet duct in an air-tight manner, and for only a fraction of a width of said inlet duct.

4. The heat recovery steam generator of claim 3 wherein said plurality of terminals are distributed on said wall of said inlet duct so that none of said terminals is aligned with any other of said terminals.

5. A heat recovery steam generator, comprising:

an inlet duct coupled to an exhaust duct of a gas turbine for receiving an exhaust gas from said gas turbine;

a plurality of air supply terminals installed in said inlet duct for mixing an additional air flow with said exhaust gas;

a heat exchange section for receiving a mixture of said air and said exhaust gas; and a transition duct between said inlet duct and said heat exchange section for receiving and distributing said mixture from said inlet duct to said heat exchange section;

said terminals being substantially equally spaced on each of two opposite side walls of said inlet duct in a staggered manner for allowing said air to be injected substantially uniformly throughout a cross-section of said inlet duct.

6. The heat recovery steam generator of claim 5 wherein said terminals extend through said side walls of said inlet duct in an air-tight manner, and for only a fraction of the width of said inlet duct.

7. The heat recovery steam generator of claim 6 wherein each terminal penetrates into said inlet duct for about one eighth of the width of said inlet duct.

8. The heat recovery steam generator of claim 6 wherein said transition duct further comprises a flow correction device downstream of said air supply terminals, for substantially evenly mixing said air with said exhaust gas, and substantially uniformly distributing said mixture of said air and said exhaust gas to said heat exchange section.

* * * * *